Feb. 9, 1971 D. J. BRIDGEFORD 3,562,368
GAS RELEASE FROM CELLULOSE CASING BY MULTIPLE PERFORATIONS
Filed Dec. 13, 1967
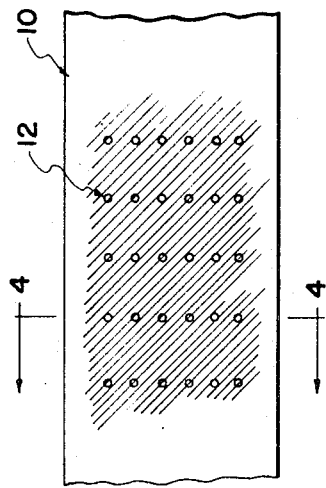
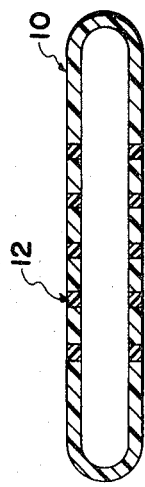
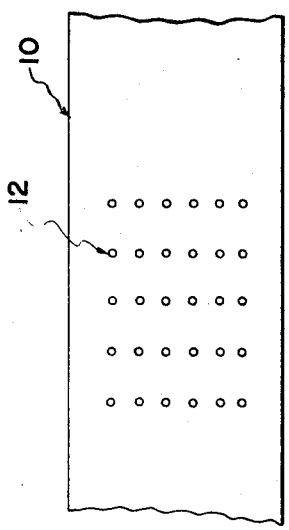
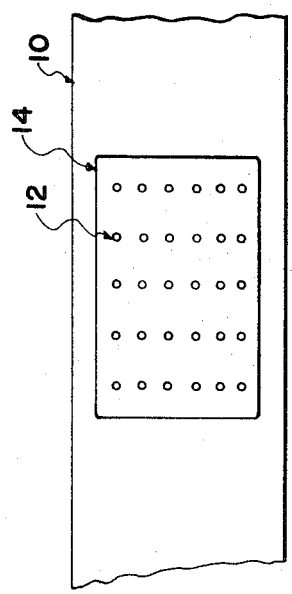
DOUGLAS J BRIDGEFORD
*INVENTOR.*
his attorney United States Patent Office 3,562,368
Patented Feb. 9, 1971

3,562,368
GAS RELEASE FROM CELLULOSE CASING
BY MULTIPLE PERFORATIONS
Douglas J. Bridgeford, Danville, Ill., assignor to
Tee-Pak, Inc.
Filed Dec. 13, 1967, Ser. No. 690,161
Int. Cl. B29d 23/04
U.S. Cl. 264—36                                           9 Claims

ABSTRACT OF THE DISCLOSURE

A method of venting fluids from artificial tubular casings made by the viscose process comprises perforating multiple small holes in a discrete area of the cellulose xanthate casing during regeneration thereof. The holes are later filled with a suitable liquid, gel-forming dope (e.g., a 16% cellulose, low degree of polymerization, viscose) or with a solid suspension or slurry of water swellable material (e.g., low alkali unregenerated cellulose xanthate) in a water-miscible organic solvent (e.g., acetone) or by securing a solid film patch such as cellulose onto the gel casing with an adhesive such as alpha-cyanomethyl acrylate monomer.

BACKGROUND OF THE INVENTION

This invention relates to a new and improved method of venting fluids from artificial tubular casings made by the viscose process. More particularly, it relates to a method of puncturing and sealing wet cellulose or gel cellulose sausage casings during the regeneration of the cellulose.

Artificial tubular casings, particularly sausage casings formed of regenerated cellulose, are prepared as hollow, thin-walled tubes of very great length. In the manufacture of continuous seamless regenerated cellulose sausage casings by the viscose process, such as is described in Dietrich et al., U.S. Pat. No. 1,908,892, a tubular casing is formed by continuously extruding viscose through an annular nozzle into an aquarium containing a mixture of sulfuric acid and sodium sulfate or ammonium sulfate or equivalent coagulating and regenerating agents. The viscose, as it passes through the aquarium, is coagulated and partially regenerated.

During the coagulating and regenerating step, gases are evolved and are entrapped within the tubular casing. In addition, water arising from syneresis of the primary xanthate gel and water entering the casing during salt formation within the casing must be released therefrom. The water enters the casing because its activity in the concentrated salt solution initially within the casing is less than its activity outside the casing. In order to prevent the casing from bursting, the water and gases must be released by puncturing the casing. In order to effect a release of these fluids, the casing is cut periodically by cutting longitudinally through the surface of the gas-inflated casing, producing a slit type opening. Generally, larger slits are required for the removal of the water as compared with the gases.

The extruded casing continues through the regeneration, desulfuring, wash and glycerination baths. The casing is then dried in an inflated state by entrapping a bubble of air between two sets of squeeze rolls, maintained at the entrance and exit of a hot air drier. In order to effect continuous inflation for drying, the casing must be free of any punctures.

Accordingly, it has been the practice to cut out that section of casing containing the puncture prior to its entrance into the dryer. The cut ends of the casing were then connected together in such a manner as to allow for the continuous passage of air through the interior of the tubing. The connection was formed by inserting into a cut end of the casing a short, flexible rubber tube or coupling. The other cut end of casing was slipped over the first end containing the tubular coupling and the two ends held together on the coupling as by circumferentially winding and knotting a piece of string over the telescoped cut sections. The coupling insert permitted free passage of air within the casing as it passed through the dryer, thus providing a bubble for inflating the tube during the drying operation, said bubble being continuously maintained by the aforedescribed squeeze rolls.

The main disadvantage is in the time and discontinuity involved in effecting this closure and in its subsequent removal. The closure is removed prior to reeling since when the casing is reeled as a flattened tubing after drying, the presence of a tubular insert causes much wrinkling of the casing on the reel.

Another disadvantage in using a tubular insert to effect closure of a punctured casing is in the amount of casing which is wasted. A further disadvantage in the case of frankfurter casing which is shirred to form a compressed stick of convenient size for stuffing operations lies in the fact that the section of casing carrying the coupling cannot pass over the shirring mandrel of the shirring apparatus and the casing cannot be shirred continuously.

Bonding or laminating dry regenerated cellulose to itself or other materials by use of an adhesive when the cellulose is dry is known. However, attempts to seal a puncture in wet regenerated cellulose seamless tubing by either coating the puncture with a film-forming material or using adhesive patches have generally not been successful. Adhesive materials, such as animal and vegetable glues, viscose, rubber adhesives, and other polymeric compositions, do not bond sufficiently and rapidly enough to wet regenerated cellulose to form a seal resistant to the inflating air pressure and the shear forces which occur when the wet cellulose tubing is dried in the inflated state.

The failure of such adhesive patches to perform satisfactorily can be accounted for by the extremely high moisture content of the regenerated cellulose casing immediately prior to drying. Typically, the casings after passing through the several water washes and aqueous glycerine and after being wiped as by doctor blades to remove surface water, contain from about 60 to about 80 percent by weight of water. The pressure of such large amounts of water, in the case of the water-soluble animal or vegetable glues or viscose, causes dilution of the glue and resultant weak bonds. In the instance of the rubber adhesives, the water content of the wet casing inhibits wetting of the regenerated cellulose surface by the water-insoluble rubber adhesive.

There have been previous attempts to patch wet cellulose with a patch of flexible material secured to the cellulose surface by means of a water-soluble polyvinyl alcohol, see Shiner et al., U.S. Pat. No. 3,247,037. The failure of such adhesive patches to prove successful commercially is largely due to difficulty in application and the slow rate of development of adhesive strength.

STATEMENT OF OBJECTS AND FEATURES

Accordingly, it is an object of this invention to provide a new and improved method of venting fluids from artificial tubular casings made by the viscose process during the regeneration of cellulose from cellulose xanthate.

Another object of this invention is to provide a method of venting fluids from artificial tubular casings such as cellulose sausage casings and sealing the vent holes in the casing.

Yet another object of this invention is to seal vent holes in wet regenerated cellulose tubular casings with a seal capable of retaining the inflating air in the casing and resistant to the shearing forces encountered during the drying of the wet casing in the inflated state.

Still another object of this invention is the sealing of vent holes in wet regenerated cellulose tubing with sealing materials, producing an effective seal with little or no interruption to the continuous manufacture of such tubing and with little or no wastage of casing.

A feature of this invention is the provision of multiple small vent holes (generally in a discrete area of the casing) to permit the venting of fluids from a gel regenerated cellulose sausage casing.

Another feature of this invention is the provision of a process wherein multiple vent holes are provided in a gel regenerated cellulose sausage casing and the holes subsequently filled with a fluid patching material or an adhesively-fastened patch.

SUMMARY OF THE INVENTION

This invention is based upon my discovery of a new and improved method of venting gases and liquids from artificial tubular casings such as cellulosic casings during the regeneration of cellulose from cellulose xanthate. It has been found that the cellulose xanthate casing or other tubular body can conveniently be perforated by any of numerous devices to form small spaced holes, usually within a discrete area of the casing. This perforation is done as the casing is treated to regenerate the cellulose. The gases and liquids produced during regeneration and trapped on the inside of the casing pass out through these holes. The total hole area is sufficient to permit ample fluid loss. At a predryer or in a wet processing state, the holes can be patched with a film patch such as regenerated cellulose secured with an adhesive such as alpha-cyanomethyl acrylate monomer (which polymerizes and cures on contact with moisture). If desired, a liquid, gel-forming dope can be used to fill the holes so that the casing is dried on size (without shrinkage and without the added thickness produced by a film patch). The holes can alternatively be filled with a water swellable material such as low alkali cellulose xanthate dispersed in a water-miscible organic solvent such as acetone.

BRIEF DESCRIPTION OF THE DRAWINGS

FIG. 1 is a plan view of a portion of a casing perforated in accordance with this invention;

FIG. 2 is a portion of a casing such as that shown in FIG. 1 covered with a patch in accordance with one embodiment of this invention;

FIG. 3 is a plan view of a portion of a casing as in FIG. 1 wherein the holes thereof have been filled in accordance with another embodiment of this invention; and FIG. 4 is a view in cross-section taken along line 4—4 of FIG. 3.

DESCRIPTION OF THE PREFERRED EMBODIMENTS

In the preferred embodiments of this invention, viscose is extruded through an annular opening into a suitable coagulation and regeneration bath. The hollow tube which is formed is subsequently treated with a regeneration bath to thoroughly regenerate cellulose. The regenerated cellulose tube is then subjected to a series of wash baths and finally treated with an aqueous solution of glycerin for plasticizing the casing. The casing is then dried in an inflated state and reeled in preparation for shirring or other processing.

At the point of extrusion, the casing is inflated by gaseous by-products which are formed within the interior of the extruded tube and also by water arising from syneresis of the primary cellulose xanthate gel and water entering the casing by osmosis. As noted above, it has been customary to cut the casing periodically by making longitudinal slashes with a sharp knife or razor blade to produce a slit-type opening. This cutting or puncturing of the casing is generally done after coagulation but prior to the regeneration bath. The cut or puncture allows the gases and liquid within the casing to vent. The casing was previously cut to remove the portion containing the puncture and the cut end connected by means of a rubber coupling which permitted the casing to be inflated for drying.

In this embodiment of the invention, the cutting of the casing with a relatively large slit for purposes of venting is replaced with a plurality of perforations or small holes. This embodiment of the invention is more readily understood by reference to FIG. 1 wherein there is shown a portion 10 of the casing which has been perforated by holes 12 in accordance with this invention. The perforations may be formed in the casing by any suitable means and are preferably made while the casing is inflated so that the holes are made in only one wall of the casing. The holes 12 may be formed by a mechanical device such as a cylinder mounted for rotary movement and having projecting prongs which engage and perforate the wall of the cellulose xanthate tube. A suitable apparatus for perforating casing in this manner is shown in Rumsey, Jr., U.S. Pat. 2,608,488. High pressure water jets, high pressure air jets, spark discharges, glass knives, punches formed of glass or other erosion resistant material, and the like can also be employed to give snag-free holes.

In carrying out this embodiment of the invention, the holes which are formed are located in a relatively small discrete area of the casing. The holes which are formed are sufficient in number and in size to provide a total area for the openings which is sufficient to permit the rapid venting of gases and liquids from within the casing. The total area must be sufficient to vent the fluids fast enough, depending upon the line speed of the process machine, so that no substantial distortion of the wet regenerated cellulose casing takes place.

In carrying out this embodiment of the invention, the holes which are formed are preferably closely spaced and are quite small. The holes are preferably about 0.025 in. in diameter, although holes ranging from about 0.01 to 0.05 in. in diameter can be used. The total number of holes formed and the spacing of the holes, as well as the spacing of separate puncture areas, depends upon the speed of operation of the process machine and the amount of fluid buildup which must be relieved. Generally, it has been found quite satisfactory to employ approximately 100 holes grouped in a square area approximately 2 square centimeters in area. The holes are generally circular in form and must be snag-free and spaced so that the casing does not tend to break or tear.

As previously noted, it is preferred that the holes be perforated in the cellulose xanthate, or partially regenerated cellulose, casing while it is in a semi-tubular or tubular condition so that the holes will only perforate one side of the casing and not extend through the other side. This is conveniently done at a stage during the regeneration process wherein the casing is partially extended because of gases formed within the casing and water present as a result of osmotic forces. If the natural inflation of the casing is not sufficient, the casing may be partially or completely blown up prior to perforating the holes therein.

After the holes have been perforated in the casing, the fluids vented, and the regeneration, desulfurizing, washing, and glycerination steps completed, the holes must be filled or patched to permit inflation of the casing in the dryer. In carrying out this invention, one preferred method comprises filling the vent holes with a fluid patching material which sets up rapidly to provide a gas tight patch. This method is illustrated in FIGS. 3 and 4 of the drawings which show the application of a patching fluid to the surface of the perforated casing, as indicated by the shaded surface area in FIG. 3, and which fills the holes as indicated by the sectioning shown in FIG. 4. In applying the patching fluid to the perforated casing, it is preferred to use (1) a liquid, gel-forming polymer or melt which is easily convertible by chemical or thermal treatment to produce a film, gel, or high viscosity liquid to plug and seal off the holes, or (2) a slurry or solid suspension of a water-swellable material such as a low-alkali-content cellulose xanthate dispersed in a water-miscible organic solvent such as acetone. Alternatively, the multiple perforations in the casing may be sealed by means of a patch 14 applied over the holes by a suitable cement, as illustrated in FIG. 2. Any suitable patch may be applied over the holes utilizing an adhesive which will adhere readily to wet or gel cellulose, preferably an adhesive such as alpha-cyanomethyl acrylate monomer which is catalyzed by contact with moisture is rapidly polymerized to form a strong adhesive bond on wet cellulose.

In the following examples, there are illustrated several preferred embodiments of the invention which illustrate the perforation of partially regenerated cellulose to release fluids therefrom and the sealing of the vent holes with the fluid patching material or the application of an adhesively bonded patch to the casing covering the vent holes.

Example 1

In the manufacture of regenerated cellulose sausage casings, coagulated and partially regenerated cellulose xanthate tubing was perforated to release gases formed in regeneration and water entering the tubing by osmotic forces. The cellulose xanthate tubing was perforated using a tool having a plurality of closely spaced pointed rods or pins of very small diameter. The casing was perforated with 100 closely spaced holes about 0.025 in. in diameter. After the casing was regenerated and washed, a patch was applied over the perforations using a water-catalyzed adhesive. The patch which was applied to the perforated area of the casing was a single thickness of regenerated celulose film and was applied to the casing using an alpha-cyanoalkyl acrylate monomer. The alpha-cyanoalkyl acrylate monomer is a water-catalyzed adhesive which polymerizes readily upon contact with water and effects a firm bond between the patch and the casing. In this process, the adhesive used was Eastman 910, a proprietary composition manufactured by Tennessee Eastman Company, comprising alpha-cyanomethyl acrylate monomer containing a small amount of a plasticizer. When the adhesive is applied to the patch and then applied to the wet casing, the adhesive is rapidly polymerized and effects a tight bond between the patch and the casing. As a result, the multiple perforations are effectively sealed and the casing will hold air under a substantial pressure in the dryer.

Example 2

Regenerated cellulose casing in the form of an extruded tube of partially coagulated and regenerated cellulose xanthate was perforated with a plurality of small holes as described in the general procedure set forth above. The multiple perforations were of a size and number permitting rapid venting of gases and liquids from within the casing. After the casing was completely regenerated and washed, a patch was applied utilizing an adhesive which is specially adherent to moist regenerated cellulose.

The procedure followed was essentially that described in Example 1 in which the adhesive was applied to a patch comprising a single layer of regenerated cellulose film and the patch applied over the multiple perforated area on the casing. In this example, the adhesive used was a polyisocyanate adhesive which sets up readily even in the presence of moisture. In this example, the adhesive used was Nacconate 100 (2,4-tolylene diisocyanate manufactured by National Aniline Division of Allied Chemical and Dye Corporation). The adhesive was applied to the patch and the patch applied over the multiple perforated area with the result that a firm seal was effected sufficient to permit the casing to be inflated under a substantial air pressure during drying.

Example 3

In this example, regenerated cellulose casing was perforated with a plurality of small closely spaced holes to vent gases and liquids from the interior of the casing as described in the previous examples. A patch of regenerated cellulose film was cemented over the perforated holes, after completion of the regeneration and washing steps, using a polymeric polyisocyanate as the adhesive.

The polymeric polyisocyanate adhesive used in patching the perforated casing is a reaction product of 2,4-tolylene diisocyanate and triethylene glycol in a 4:3 molar ratio, prepared as follows:

Two-thirds equivalent (58.0 g.) of tolylene diisocyanate (Nacconate 100) was weighed into a 250 ml. beaker. Next, 4.5 g. of methylethyl ketone was added to the beaker as a mutual solvent for the reaction. The beaker was placed under a Heller mixer and stirred vigorously while one-half equivalent (37.5 g.) of triethylene glycol was added drop-wise. During the reaction period, an additional 7.8 g. of methylethyl ketone were added to replace the solvent which had boiled off. The reaction mixture was allowed to cool occasionally to 70° C. before additional triethylene glycol was added. At the end of the reaction period, a polymeric polyisocyanate reaction product was obtained which is a clear lemon-yellow syrup.

In patching a multiple perforated casing in accordance with this example, the polymeric polyisocyanate adhesive was applied to a regenerated cellulose film and the film applied as a patch over the perforated area. The adhesive sets up readily and provides a firm bond sealing the holes in the casing and permitting the casing to be inflated under a substantial air pressure during drying.

In this example and the preceding examples, the patch which was applied to the multiple perforated area on the cellulose casing was described as a regenerated cellulose film. In practice, any suitable sheet material which is impermeable and flexible, such as paper, cotton, cloth, etc., may be used as the patch. The adhesive may be applied either to the patching material or to the surface of the perforated casing. If necessary, the adhesive may be applied to the perforated casing at the area surrounding the holes and the patch with additional adhesive applied thereto to seal the holes in preparation for inflation of the casing in the dryer.

Example 4

In this and succeeding examples, there are illustrated several embodiments of the invention in which casing is provided with multiple perforations for release of gas and internal liquids at the coagulation and regeneration stages and the multiple perforations are subsequently sealed using a fluid patching material which sets up readily on contact with moisture. Preferably, the patching material is one which sets up into a gel or solid with substantially no change in volume so that there is no tendency for the plug which is formed to pull away from the edge of the holes.

In this example, regenerated cellulose casing which had been perforated shortly after coagulation was sealed using a high cellulose dope. A 16% cellulose content low D.P. (degree of polymerization) viscose was applied to the perforated area to plug the perforations. The dope sets up into a gel and then solidifies upon heating. The gel as applied in the fluid state fills the holes readily and will hold air pressure within the inflated casing as the casing enters the dryer. As the casing is dried, the cellulose dope is regenerated to form plugs of regenerated cellulose which are bonded to the walls of the perforations.

Example 5

In this example, the use of other gel-forming dopes for patching multiple perforations in regenerated cellulose casing is illustrated.

Gel-forming dope materials which are suitable for sealing multiple perforations in regenerated cellulose casing include hydrophilic polymers which are water soluble or water dispersible to form relatively thick viscous dopes which may be used to fill the holes or perforations in perforated casing and which may be coagulated by treatment with acid or by heat to form a solid or gel from the dope plugging or filling the perforations. In particular, decausticized or low-alkali-content viscose, solutions of cellulose in decausticized or low-alkali-content amylose xanthate, methyl cellulose, and mixtures thereof, may be used to fill the perforations or holes in perforated gel or wet cellulosic casing and coagulated by treatment with acid or by heating the produce solid or gel plugs filling the perforations. The dopes may be applied in any suitable manner by use of brushes, squeegees, rollers, belts, or the like. The dopes as applied effect an airtight plugging of the perforations by coagulation, chemical netralization, solvent evaporation, or solvent loss by miscibility with the water in the wet or gel casing.

Example 6

In this and succeeding examples, there is illustrated the use of fluid patching materials comprising a slurry or suspension of a hydrophilic gel-forming material in a substantially non-swelling water miscible solvent. When the slurry is applied to a perforated wet or gel cellulose, the particles of hydrophilic water-swellable polymer are applied within the perforations and the solvent lost by miscibility with the water in the casing. As the solvent disperses into the water present in the casing, the water from the casing contacts the individual hydrophilic gel-forming particles with the result that the particles swell and fill the perforations to form a gastight seal.

Equal parts by weight of acetone, water, and a solid, finely-divided, low-alkali-content cellulose xanthate were mixed to produce a fluid patching slurry. The slurry which was prepared comprises partially swollen particles of the low-alkali-content cellulose xanthate dispersed in acetone and has the consistency of a moderately thick paste. The patching slurry was applied to a perforated gel cellulose tubular casing with a brush and quickly filled the perforations. When the slurry was brushed into the holes in the casing, the individual particles of low-alkali-content cellulose xanthate were rapidly swollen as a result of contact with the water in the casing while the acetone dispersed into the water in the casing. The particles of low-alkali-content cellulose xanthate were rapidly swollen by contact with the water to form gel cellulose xanthate plugs providing a gastight seal. As the casing was inflated and passed through the dryer, the cellulose xanthate gel plugs in the perforations were regenerated thermally to produce regenerated cellulose plugs which adhere tightly to the dried casing.

Example 7

Another adhesive patching composition was prepared by mixing 30% wt. dimethyl sulfoxide, 30% wt. dimethyl formamide, and 40% wt. low-alkali-content cellulose xanthate powder. This slurry was used to coat the perforations in gel cellulose casing which had been perforated as described in the previous examples for release of fluids during regeneration of the cellulose. When the adhesive slurry was spread over the perforated area, the individual holes were filled with the particles of cellulose xanthate. The dimethyl sulfoxide and dimethyl formamide from the mixture rapidly dispersed into the water in the gel casing and the water from the casing caused the particles of cellulose xanthate to swell rapidly and plug the holes. The plugs formed of the swollen cellulose xanthate particles provide a gastight seal permitting inflation of the casing for drying. During the drying of the casing, the particles of cellulose xanthate were thermally regenerated into plugs of cellulose tightly filling the holes.

Example 8

A series of experiments were carried out in which various adhesive compositions were prepared by mixing finely-powdered water-swellable polymers in a water-miscible liquid and used to patch the holes or perforations in gel cellulose casing which had been perforated to release gases or liquids during the regeneration of the casing. The adhesive compositions which were used are set forth in Table I below.

TABLE I.—ADHESIVE SLURRY COMPOSITION

40% cellulose xanthate, 30% water, 30% acetone
40% cellulose xanthate, 30% dimethyl sulfoxide, 30% acetone
50% cellulose xanthate, 50% dimethyl sulfoxide,
30% cellulose xanthate, 70% dimethyl sulfoxide,
40% cellulose xanthate, 30% water, 30% tetrahydrofuran
50% cellulose xanthate, 50% tetrahydrofuran,
30% cellulose xanthate, 70% tetrahydrofuran,
40% cellulose xanthate, 30% tetrahydrofuran, 30% acetone
40% cellulose xanthate, 30% tetrahydrofuran, 30% dimethyl sulfoxide
40% carboxymethyl cellulose, 30% water, 30% acetone
40% carboxymethyl cellulose, 30% dimethyl sulfoxide, 30% acetone
50% carboxymethyl cellulose, 50% dimethyl sulfoxide,
30% carboxymethyl cellulose, 70% dimethyl sulfoxide,
40% carboxymethyl cellulose, 30% water, 30% tetrahydrofuran
50% carboxymethyl cellulose, 50% tetrahydrofuran,
30% carboxymethyl cellulose, 70% tetrahydrofuran,
40% carboxymethyl cellulose, 30% tetrahydrofuran, 30% acetone
40% carboxymethyl cellulose, 30% tetrahydrofuran, 30% dimethyl sulfoxide
40% sodium alginate, 30% water, 30% acetone
40% sodium alginate, 30% dimethyl sulfoxide, 30% acetone
50% sodium alginate, 50% dimethyl sulfoxide,
30% sodium alginate, 70% dimethyl sulfoxide,
40% sodium alginate, 30% water, 30% tetrahydrofuran
50% sodium alginate, 50% tetrahydrofuran,
30% sodium alginate, 70% tetrahydrofuran,
40% sodium alginate, 30% tetrahydrofuran, 30% acetone
40% sodium alginate, 30% tetrahydrofuran, 30% dimethyl sulfoxide
40% polyvinyl alcohol, 30% water, 30% acetone
40% polyvinyl alcohol, 30% dimethyl sulfoxide, 30% acetone
50% polyvinyl alcohol, 50% dimethyl sulfoxide,
30% polyvinyl alcohol, 70% dimethyl sulfoxide,
40% polyvinyl alcohol, 30% water, 30% tetrahydrofuran
50% polyvinyl alcohol, 50% tetrahydrofuran,
30% polyvinyl alcohol, 70% tetrahydrofuran,
40% polyvinyl alcohol, 30% tetrahydrofuran, 30% acetone
40% polyvinyl alcohol, 30% tetrahydrofuran, 30% dimethyl sulfoxide In each of the above-noted examples, the water-swellable hydrophilic polymer in a finely-divided or powdered state is admixed with the water-miscible diluent in the proportions indicated. The composition which is prepared is a viscous slurry which may be applied to the perforated area on gel cellulose casing as described in the previous examples. In applying the adhesive slurry to the perforated area on gel cellulose casing, it is preferred to work the adhesive material into the holes so that they are plugged by the swollen particles of hydrophilic polymer.

When the adhesive slurry composition is spread over the perforated area and worked into the holes, the individual particles of hydrophilic polymer, e.g., cellulose xanthate, carboxymethyl cellulose, sodium alginate, polyvinyl alcohol, etc., are swollen by contact with water from the gel casing and the water-miscible liquid in which the particles were dispersed is rapidly dissipated by mixing with the water in the casing. The individual particles of swollen polymer plug the holes with a gastight plug and form a solid plug integral with the wall of the casing when the casing is inflated and dried.

Example 10

In the foregoing examples, an adhesive slurry was prepared by dispersing a hydrophilic water-swellable polymer in various organic solvents (with or without additional water being present) which made possible the application of the water-swellable polymer particles in an unswollen or partially swollen condition. When the patching composition was applied to the casing and worked into the perforations, the individual particles were swollen by contact with water from the gel casing while the solvent was diluted into the water in the casing. It is also possible to disperse a hydrophilic polymer into a concentrated aqueous salt solution which will not dissolve and will not appreciably swell the polymer. The slurry of the polymer particles may be applied to the perforated area on a gel cellulose casing as described in the previous examples.

A slurry is prepared consisting of 40% low-alkali-content cellulose xanthate powder and 60% of a saturated aqueous solution of sodium sulphate. The cellulose xanthate powder is easily dispersed in the aqueous sodium sulphate solution without dissolving and without excessive swelling. When this slurry is applied to the perforated area on gel cellulose casing and worked into the perforations, the sodium sulphate solution is rapidly diluted with water from the gel casing and the cellulose xanthate particles are swollen to form gastight plugs in the holes.

In preparing adhesive slurry compositions in accordance with this example, other salts such as ammonium sulphate or potassium sulphate may be used in aqueous solution as the dispersing medium for the cellulose xanthate powder. The salt solutions which are used as a dispersing medium for the cellulose xanthate powder do not have to be saturated solutions. The salt solutions which are used need only be of a sufficient concentration to prevent the cellulose xanthate powder from dissolving or from excessive swelling. The adhesive slurry compositions which may be prepared in accordance with this example may include any of the various hydrophilic water-swellable polymers, such as finely-powdered carboxymethyl cellulose, sodium alginate, polyvinyl alcohol, etc., dispersed in a concentrated aqueous salt solution containing sufficient salt to prevent the powdered hydrophilic polymer from dissolving or from swelling excessively. When the adhesive slurry composition is applied to the perforated area on gel cellulose casing as previously described, the salt solution is diluted with water from the gel casing and the particles of hydrophilic polymer are rapidly swollen to fill the holes in the casing wall.

In the foregoing examples, the procedure of perforating a gel casing and applying a patch over the perforations or applying a fluid patching material to fill the perforations has been described with reference to a clear, tubular, regenerated cellulose casing. The procedure can be used, however, on any gel or wet cellulose film and is especially useful in the manufacture both of clear, regenerated cellulose casings and regenerated cellulose casings reinforced with a paper web (known in the art as fibrous casings). It should also be noted that while the process of applying patches to a perforated gel cellulose or of filling the holes in a perforated gel cellulose with an adhesive patching fluid has been described with special reference to regenerated cellulose made by the viscose process, it is obvious that the technique of patching or of applying a patching fluid to holes in gel cellulose or wet cellulose is equally applicable to wet regenerated cellulose made by other processes such as the denitration of nitrocellulose or deacetylation of cellulose acetate, as well as modified cellulosic films, such as cellulose ethers. It should also be noted that, while the process of perforating a film and subsequently patching or filling the perforations has been described with special emphasis upon regenerated cellulose, it is obvious that the process may, in principle, be applied to the patching of other plastic films. In the manufacture of any tubular plastic film wherein the extrusion of the material is continuous and there is a buildup of fluids within the film, the fluids may be released by perforating the film with a plurality of small, closely spaced holes and subsequently applying a patch over the perforated area or applying a fluid patching material to fill the holes in the perforated area.

This process is especially adaptable to automation. The steps of perforation and patching can be performed by automatic equipment. Also, the patching fluid or the patching film (in the case of a separately applied patch) may be colored, which makes possible automatic sensing of the patch, photoelectrically, during further processing, such as reeling or shirring.

While this invention has been described with reference to several preferred embodiments, it is to be understood that within the scope of the appended claims, the invention may be practiced otherwise than as specifically described herein.

I claim:

1. In the method of producing tubular casings by continuous extrusion of a polymeric material through an annular die, wherein fluids accumulate within the extruded casing, the improvement which comprises perforating said casing with a plurality of small holes to vent the accumulated fluids, and subsequently filling said holes with a fluid patching medium which solidifies to form a gas tight seal.

2. A method in accordance with claim 1 in which the perforation of said casing is done at selected intervals and said plurality of holes are closely spaced and are of a number and size adequate to effect a rapid venting of fluids from within said casing.

3. A method in accordance with claim 1 in which the casings are produced by extrusion of viscose through an annular die into a coagulating and regenerating medium and subsequently washed, plasticized, and dried, and the perforations are made after extrusion to release by-product gases and osmotic water within the casing.

4. A method in accordance with claim 1 in which said holes are sealed by application of a gel-forming dope and wherein said dope is hardened to form a solid patch.

5. A method in accordance with claim 1 in which said holes are sealed by application of a fluid patching material comprising a slurry of hydrophilic water-swellable solid particles dispersed in a water-miscible liquid.

6. A method in accordance with claim 5 in which said particles are finely-divided, low-alkali cellulose xanthate, sodium aliginate, carboxymethyl cellulose, or polyvinyl alcohol.

7. A method in accordance with claim 5 in which the liquid is a water-miscible organic solvent or a mixture thereof with water.

8. A method in accordance with claim 5 in which the liquid is a concentrated aqueous salt solution.

9. A method in accordance with claim 5 in which said slurry comprises finely-divided, low-alkali cellulose xanthate dispersed in a water-miscible organic solvent, or a mixture of a water-miscible organic solvent and water, or a concentrated aqueous salt solution.

(References on following page)

References Cited

UNITED STATES PATENTS

| | | | |
|---|---|---|---|
| 2,545,243 | 3/1951 | Rumsey Jr. | 264—154 |
| 2,748,863 | 6/1956 | Benton | 264—154(X) |
| 3,123,482 | 3/1964 | Lieberman | 99—176 |
| 3,123,653 | 3/1964 | Lieberman | 99—109(X) |
| 3,247,037 | 4/1966 | Shiner et al. | 161—249(X) |
| 3,248,040 | 4/1966 | Friedman | 99—176(X) |
| 2,210,436 | 8/1940 | Weingand et al. | 264—173(X) |
| 2,771,936 | 11/1956 | Iknayan et al. | 156—115 |
| 2,873,715 | 2/1959 | Signer | 118—34 |
| 3,123,480 | 3/1964 | Lieberman | 99—176 |
| 3,123,483 | 3/1964 | McKnight | 99—176 |
| 3,346,402 | 10/1967 | Lieberman | 99—176 |
| 3,378,379 | 4/1968 | Shiner et al. | 99—176 |

ROBERT F. WHITE, Primary Examiner

T. J. CARVIS, Assistant Examiner

U.S. Cl. X.R.

99—109; 117—2; 156—94; 264—156, 188, 209, 173